F. A. SUMNER.

Clothes-Pounder.

No. 8,496. Reissued Nov. 19, 1878.

Witnesses:

Samuel Snow

Geo. J. Richardson

Inventor:

Franklin A. Sumner

N. PETERS, PHOTO-LITHOGRAPHER, WASHINGTON, D. C.

UNITED STATES PATENT OFFICE.

FRANKLIN A. SUMNER, OF OLD FORT, NORTH CAROLINA.

IMPROVEMENT IN CLOTHES-POUNDERS.

Specification forming part of Letters Patent No. 199,942, dated February 5, 1878; Reissue No. 8,496, dated November 19, 1878; application filed July 11, 1878.

*To all whom it may concern:*

Be it known that I, FRANKLIN A. SUMNER, of Old Fort, in the county of McDowell and State of North Carolina, have invented a new and useful Improvement in Clothes-Washers, of which the following is a full, clear, and exact description, reference being had to the drawings accompanying and forming part of this specification.

Clothes-washers of the class commonly known as "pounders" have been provided with an air-cavity in the lower end for the purpose of securing the advantage resulting from the compression of air therein as the pounder descends upon the clothes, and the subsequent ejection of the same by reaction just after contact of the pounder with the clothes, the expelled air in such case permeating the latter and displacing the water at various points beneath the pounder, more or less, so that it is forced through the clothes.

The object of this invention is to accomplish this result of forcing air and water through the clothes more perfectly than it is accomplished by the pounder of the usual form; and to this end the invention consists of the combination of a cylinder closed at the top and bottom, a base in the form of an inverted truncated funnel, open at the bottom and attached to the bottom of the cylinder, a piston moving vertically in the cylinder, a suitable spring acting to force the said piston to the top of the cylinder, and a series of tubes suitably attached to the bottom of the cylinder, communicating with the cylinder and extending nearly to the bottom of the base.

Figure 1:
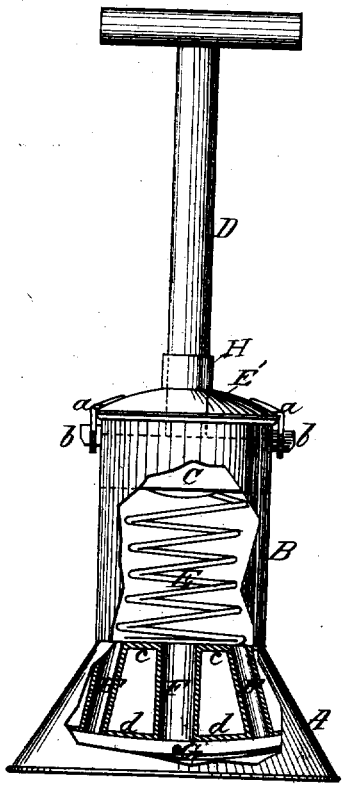
Figure 2:
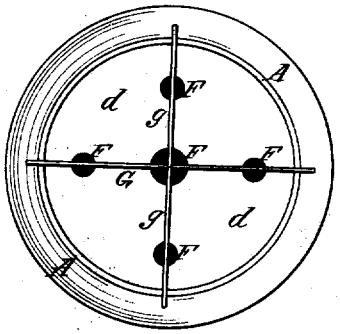

In the accompanying drawings, Figure 1 is a side elevation of my improved clothes-washer, a part of one side being shown as broken away for the purpose of showing the interior construction; and Fig. 2 is a bottom-plan view of the same.

In these figures the same letters refer to the same parts.

A is the base, which has the form of an inverted truncated funnel, so that when placed upon the clothes it covers a larger area than the bottom of the cylinder. B is the cylinder, which is so attached to the upper part of the base that the two are practically integral. C is the piston, working vertically in the cylinder, being aided in its upward movement by the resiliency of the spring E, upon which it rests. This piston is suitably packed to prevent escape of air past it, and is provided with a suitable handle, D, by means of which it is operated. It is guided in part by the inner wall of the cylinder and in part by a flange or collar, H, on the cover E′, through which the handle D passes. This cover E′ is detachably secured to the cylinder by links *a* and ears *b*, as shown.

The spring E rests upon the bottom *c* of the cylinder, and by being placed in the same chamber from which the water is alternately drawn and expelled the utmost economy of space is attained.

F F are a series of small tubes suitably attached to the bottom of the cylinder, and forming a means of communication between the interior of the cylinder and the air-cavity formed by the hollow base A. The bottoms of these tubes are attached to a diaphragm, *d*, extending across the base A near its bottom, which diaphragm serves to support the tubes.

G *g* are two wires attached to the base A below the mouths of the tubes, and crossing each other. The wires prevent the clothes packing around or obstructing the mouths of the tubes F F.

The operation of this apparatus is as follows: In place of being used like the ordinary atmospheric pounders—namely, as a beater—the device is placed upon the clothes submerged in a suitable receptacle, and the piston is then forced down quickly by pressing on the handle D. This movement compresses the air which fills the cavity of the funnel, the tubes, and the cylinder B, below the piston, and forces a portion of the same into and through the clothes, thereby causing the displacement from the meshes of the latter of a portion of the water in which they are immersed. So soon as the piston has been thus forced down the pressure upon it is removed, and the elasticity of the spring E raises the piston to its original position, as shown in Fig. 1, when, owing to the vacuum caused by the previous expulsion of the air by the downward movement of the piston, the water follows the piston in its upward movement and fills the funnel, tubes, and also the cylinder, in part. Upon the next descent of the piston, by pressing upon the handle, this water is forcibly ejected, along with a portion of the air confined in the cylinder above the water, and the result is that the rapid passage through the clothes of the several streams of water and currents of air, or mingled water and air, very quickly effects the cleansing of that portion of the clothes under the base A.

The apparatus is moved from one place to another upon the clothes, as required, until the whole quantity has been thoroughly cleansed.

This washer combines the most desirable elements—to wit, compactness, simplicity, and economy of construction, and great capacity for easy and efficient operation.

What I claim as my invention is—

1. The combination, with the tubes F, extending from the bottom of the cylinder B, of the flaring shield A and diaphragm *d*, supporting the outer ends of the tubes, as set forth.

2. The combination of the hollow cylinder B, the hollow flaring base A, as described, the tubes F F, extending from the bottom of the cylinder nearly to the bottom of the base, the diaphragm *d*, the piston C, and the spiral spring E, placed in the cylinder, between the piston and the bottom *c* of the cylinder, substantially as and for the purpose set forth.

In witness whereof I have hereunto set my hand on this 20th day of June, 1878.

FRANKLIN A. SUMNER.

Witnesses:

SAMUEL SNOW,

GEO. J. RICHARDSON.